(12) United States Patent
Hendricks et al.

(10) Patent No.: US 6,485,383 B1
(45) Date of Patent: Nov. 26, 2002

(54) THERMAL COMPENSATION BELT DRIVE TENSIONER

(75) Inventors: Jeffrey T. Hendricks, Camas, WA (US); Robert P. Callaway, Vancouver, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/568,442

(22) Filed: May 10, 2000

(51) Int. Cl.[7] ............................................... F16H 7/08
(52) U.S. Cl. ................................................... 474/101
(58) Field of Search ................... 474/101, 109, 474/110, 112, 113, 114, 115, 116, 117, 137, 138

(56) References Cited

U.S. PATENT DOCUMENTS

| | | | |
|---|---|---|---|
| 4,761,154 A | | 8/1988 | Beauchamp et al. |
| 4,767,685 A | * | 8/1988 | Wilson ........................ 474/138 |
| 4,966,571 A | * | 10/1990 | de Guillebon .............. 474/111 |
| 6,158,849 A | * | 12/2000 | Veciana et al. ................ 347/85 |

* cited by examiner

*Primary Examiner*—Thomas R. Hannon
*Assistant Examiner*—Timothy McAnulty

(57) ABSTRACT

A method and apparatus for maintaining a substantially constant belt tension under changing temperature conditions is provided by a geometric layout of a motor, belt and pulley system and a selection of manufacturing materials for component parts having a predetermined relationship of thermal expansion coefficients between themselves.

16 Claims, 5 Drawing Sheets

THERMAL COMPENSATION BELT DRIVE TENSIONER

BACKGROUND OF THE INVENTION

1. Field of the Invention

The present invention relates generally to belt drives, more specifically to hard copy apparatus having a scanning carriage for translating writing instruments across print media and, more particularly, to a thermal compensation belt drive tensioner for a scanning ink-jet printer carriage.

2. Description of Related Art

The art of ink-jet technology is relatively well developed. Commercial products such as computer printers, graphics plotters, copiers, and facsimile machines employ ink-jet technology for producing hard copy. The basics of this technology are disclosed for example, in various articles in the assignee's Hewlett-Packard Journal, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994) editions. Ink-jet devices are also described by W. J. Lloyd and H. T. Taub in Output Hardcopy [sic] Devices, chapter 13 (Ed. R. C. Durbeck and S. Sherr, Academic Press. San Diego, 1988).

FIG. 1 depicts a hard copy apparatus, in this exemplary embodiment a computer peripheral, ink-jet printer, 101. A housing 103 encloses the electrical and mechanical operating mechanisms of the printer 101. Operation is administrated by an electronic controller 102 (usually a microprocessor or application specific integrated circuit ("ASIC") controlled printed circuit board) connected by appropriate cabling to a computer (not shown). It is well known to program and execute imaging, printing, print media handling, control functions and logic with firmware or software instructions for conventional or general purpose microprocessors or with ASIC's. Cut-sheet print media 105, loaded by the end-user onto an input tray 120, is fed by a suitable paper-path transport mechanism (not shown) to an internal printing station, or "print zone," 123 where graphical images or alphanumeric text is created. A carriage 109, selectively positionable on a rod 111, scans the print medium. An encoder subsystem 113 is provided for keeping track of the position of the carriage 109 at any given time. A set of individual ink-jet pens, or print cartridges, 115X is mounted in the carriage 109 (generally, in a full color system, inks for the subtractive primary colors, cyan (X=C), yellow (X=Y), magenta (X=M) and true black (X=K) are provided; in some implementations an ink-fixer chemical (X=F) is also used). An associated set of replaceable or refillable ink reservoirs 117X is coupled to the pen set by ink conduits 119. Once a printed page is completed, the print medium is ejected onto an output tray 121. The carriage scanning axis is conventionally designated the x-axis, the print media transit axis is designated the y-axis, and the printhead firing direction is designated the z-axis. For convenience in describing the art and the present invention, all types of ink-jet hard copy apparatus are sometimes hereinafter referred to as "printers;" all types, sizes, and compositions of print media are also referred to as "paper;" all compositions of colorants are sometimes referred to as "ink;" and all embodiments of an ink-jet writing instruments are sometimes hereinafter simply referred to as a "open;" no limitation on the scope of the invention is intended nor should any be implied.

Generally, a belt drive subsystem can be used to mount and selectively move the carriage 109 for scanning bidirectionally across the print zone 123. Instantaneous positioning of the printhead to the print medium is critical to prevent a printing error and ensure throughput performance. Belt tension is an important parameter and is varied dependent primarily on the drive loads required, margin desired, and belt-pulley design.

FIG. 2 (PRIOR ART) illustrates a belt 100 connected to a reversible motor 300 and a pulley 500, both of which are usually affixed to a printer housing framework (not shown). A pulley axle 700 fits slidingly in slots 900 in a mounting frame 110. Assembled, the belt 100 extends through an aperture 130 in the frame 110. The pen carriage 109 (not seen in this view) rides on a guide rod 111 as in FIG. 1 and is attached to the belt 100. Since the pulley axle 700 makes a sliding fit and the belt must be long enough to reach beyond the end 170 of the mount 110 to encircle the pulley 500 before it is fit into the slots 900, a spring loaded tensioner 190 is used to achieve the proper post-assembly tension. After the pulley 500 is fit into the slots 900, the tensioner 190 is inserted such that the axle 700 will ride on a tensioner surface 210. An extension table 230, with a tensioning spring 250 surrounding it, is rotatingly slipped into slot 270 of the mount 110. By designing to a close tolerance, the tensioner surface 210 will pull the pulley outward along the slots 900 just until the belt 100 is properly tensioned. Another spring loaded tensioner is shown in U.S. Pat. No. 4,761,154, filed by Beauchamp et al. for a BELT TENSIONER (assigned to the common assignee herein and incorporated herein by reference).

Another prior art design, that has a lower belt tension requirement over the spring loaded design, is the standard fixed center tensioner that includes a spring loaded belt tensioner that provides initial belt tension and a locking mechanism to fix the tensioner to a predetermined setting. As the belt stretches under load and during thermal and humidity excursions, the hardware expands and contracts, resulting in changing pulley center-to-center spacing. The result is a change in belt tension from the initial setting.

In such solutions, as the belt stretches under load and during thermal and humidity excursions, the hardware can also expand and contract, resulting in a spring deflection and, therefore, a belt tension change. Such systems are designed with the lowest possible spring rate so that such a tension change is minimized. However, at higher acceleration and deceleration loading and higher scanning speeds which increase printing throughput, belt tensions must be increased to prevent belt slip at the motor and pulley interfaces. Moreover, for an ink-jet implementation, due to the advancement in pen design and increasing the number of printheads on-axis (or, for disposable or refillable print cartridges having a self-contained, on-axis, ink supply where the cartridge size is increasing to meet the demand for full bleed printing (e.g., photographic reproductions)), the total carriage weight increases. Increasing belt tension increases loading on the motor axle bearings. One solution is to add precision bearings to the motor shaft, but only at a significant cost impact on manufacturing. During temperature and humidity excursions, the material will experience an expansion or contraction ("EC") proportional to the respective material coefficient of thermal expansion ("CTE"). Note that CTE can be a positive or negative value. Depending upon the materials used in fabricating the mechanism, differing material CTE may generate a belt tension increase or decrease during temperature excursions.

There is a need for a method and apparatus to maintain a substantially constant belt tension during temperature changes, There is a need for a method and apparatus to run relatively low belt tensions in high speed printers to increase motor life. There is also a need for a low cost solution.

SUMMARY OF THE INVENTION

In its basic aspects, the present invention provides a belt tensioner device, including: an adjustably mountable frame for mounting to a chassis; a pulley fork biasingly mounted to the frame; and a belt pulley mounted between the frame and the fork wherein the frame and fork are co-associated and fabricated of materials each having a complementary CTE to compensate for temperature excursions affecting belt tension.

In another basic aspect, the present invention provides a belt tensioner for an apparatus having a chassis with a belt drive motor affixed thereon for providing translational motion to a belt coupled thereto, wherein the chassis formed of a material having a first CTE, including: first mechanisms for holding a belt pulley axle at a first end, the first mechanisms including mechanisms for fixedly attaching the belt tensioner to the chassis such that the belt is in tension between the belt drive motor and the belt pulley and such that material EC of the first means due to thermal expansion and contraction is diametrically opposed to material EC of the chassis, wherein the first mechanisms are formed of a material having a second CTE and wherein the first CTE and the second CTE are related in proportion to a ratio of a linear distance between the motor and the mechanisms for fixedly attaching the belt tensioner and the distance between the pulley axle and the mechanisms for fixedly attaching the belt tensioner such that EC of each is in substantially identical proportion to the ratio; and a second mechanism for holding the belt pulley axle at a second end, wherein the second mechanism is captured by the first mechanisms and the second mechanism is formed of a material having a third CTE wherein the third CTE is substantially lower than the first CTE and the second CTE such that the second mechanism is substantially unaffected during material EC of the chassis and the second mechanism.

In another basic aspect, the present invention provides an ink-jet printhead scanning carriage drive belt tensioner subsystem for a drive motor and carriage drive belt system, wherein the drive motor is mounted in a first position on a chassis, including: a belt pulley having an axis of rotation; a frame for positioning the belt pulley with respect to the motor, including fastening mechanisms for affixing the frame to the chassis at a second position; and a fork for positioning the belt pulley on the frame such that the belt pulley is between the first position and the second position and the belt is tensioned between the motor and the pulley; the chassis, the frame, and the fork each being fabricated of a material having a differing, compensating, CTE characteristic such that material EC of the chassis and the frame is balanced wherein the axis of rotation remains in a substantially constant position with respect to the first position.

In another basic aspect, the present invention provides a method for maintaining a predetermined tension of a drive belt between a belt drive motor and a belt pulley, including the steps of: affixing the motor to a chassis at a first predetermined position, the mount having a known mount material CTE; affixing the pulley on a frame at a predetermined frame position, the frame having a known frame material CTE; affixing the frame to the chassis at a second predetermined position such that the predetermined tension is established and the pulley is located along a plane between the first predetermined position and the second predetermined position, wherein the length $L_2$ of the frame and the length $L_3$ of the fork is related to the frame material CTE and the fork material CTE, the chassis material CTE and length $L_1$, and the belt CTE and length $L_{Belt}$, wherein means for affixing the pulley on the frame comprises a material having an affixing means CTE substantially less than the frame material CTE such that substantially no material EC is experienced by the means for affixing during proportional material EC of the mount and the frame.

In another basic aspect, the present invention provides an ink-jet hard copy apparatus, having a scanning carriage for translating at least one ink-jet writing instrument mounted thereon across adjacently positioned print media, including: an apparatus chassis, fabricated of a material having a $CTE_{chassis}$; a drive motor mounted to the chassis at a first position; a belt pulley mounted on a pulley frame by a pulley fork, wherein the pulley frame is fabricated of a frame material having a $CTE_{frame}$ which is greater than $CTE_{chassis}$ and wherein the pulley fork is fabricated as a fork material having a third $CTE_{fork}$ which is substantially less than the $CTE_{chassis}$ such that there is substantially no center-center change between the motor pulley axis and the turn around pulley axis during thermal excursions wherein the belt material CTE is non-affective as relative to the $CTE_{fork}$, $CTE_{chassis}$, $CTE_{frame}$; and a belt tensioned between the motor and the pulley and having the carriage mounted thereon wherein the pulley frame is affixed to the chassis at a second position with the pulley positioned between the first position and the second position such that a predetermined belt tension is established and maintained regardless of material EC of the chassis and the frame.

In another basic aspect, the present invention provides an ink-jet hard copy apparatus, having a beltriven scanning carriage for translating at least one ink-jet writing instrument mounted thereon across adjacently positioned print media, including: a belt tensioner device, including an adjustably mountable frame for mounting to a chassis, a pulley fork biasingly mounted to the frame, and a belt pulley mounted between the frame and the fork, wherein the frame and fork are co-associated and fabricated of materials each having a complementary CTE to compensate for temperature excursions affecting belt tension.

Some of the advantages of the present invention are:

It maintains a relatively constant belt tension during environmental temperature excursions;

it allows for lower belt tension in a belt drive system, allowing the use of lower cost bush bearings and increasing motor life; and it provides for increased printer performance at a lower cost.

The foregoing summary and list of advantages is not intended by the inventors to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
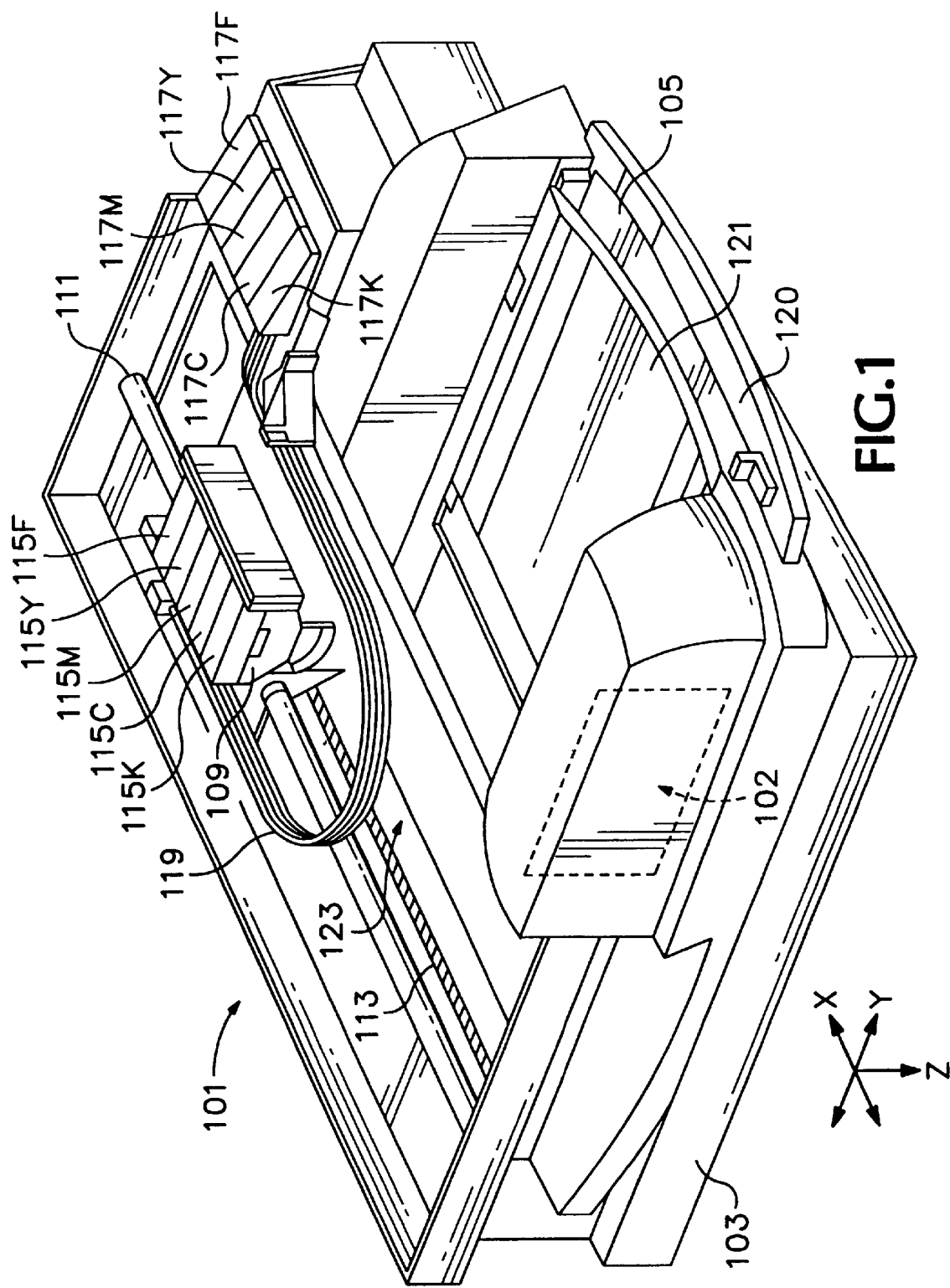
FIG. 1 is an exemplary embodiment of an ink-jet printer which can employ the present invention (not shown in this view).
Figure 2:
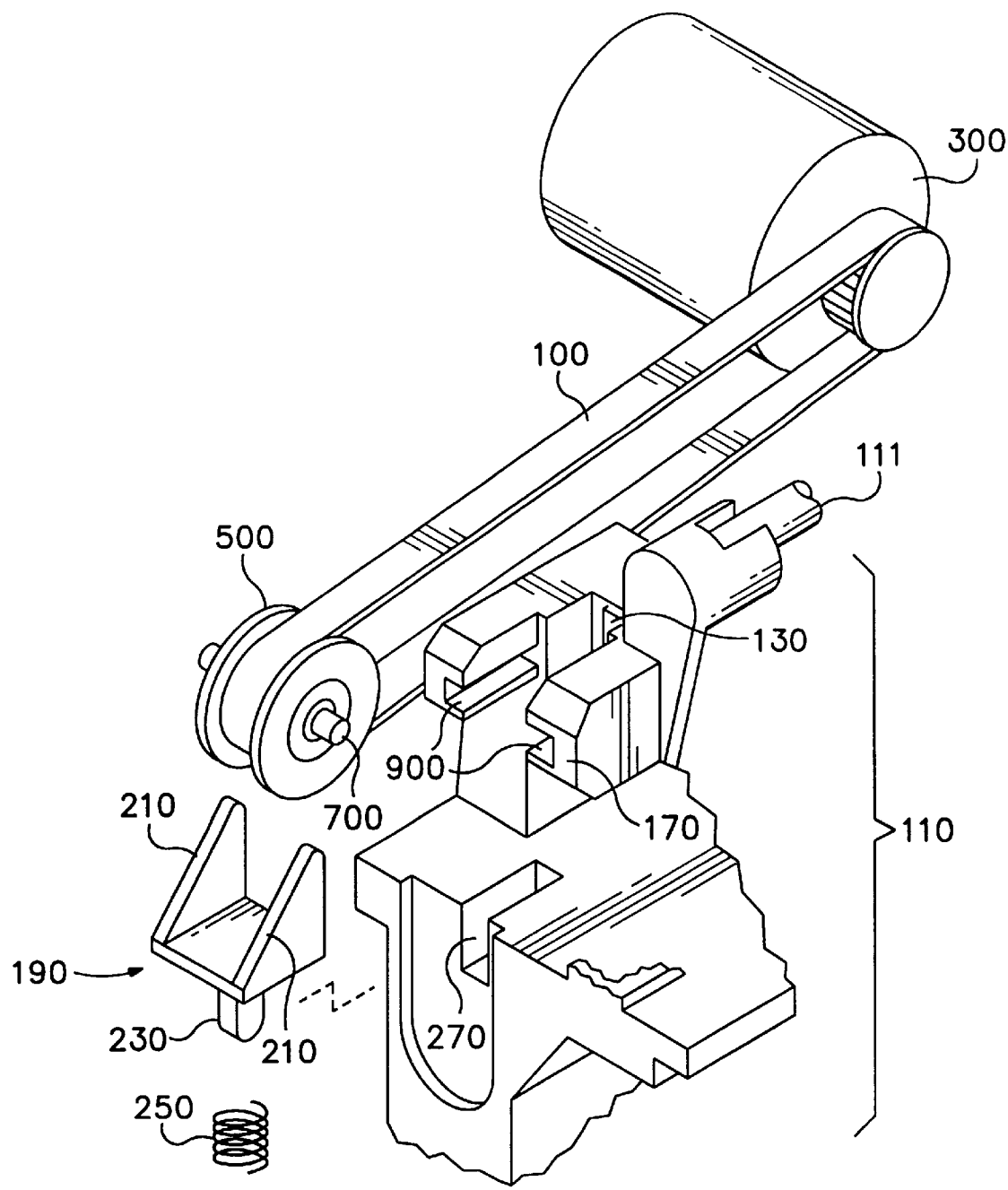
FIG. 2 (PRIOR ART) is a known manner spring loaded belt tensioner system.
Figure 3:
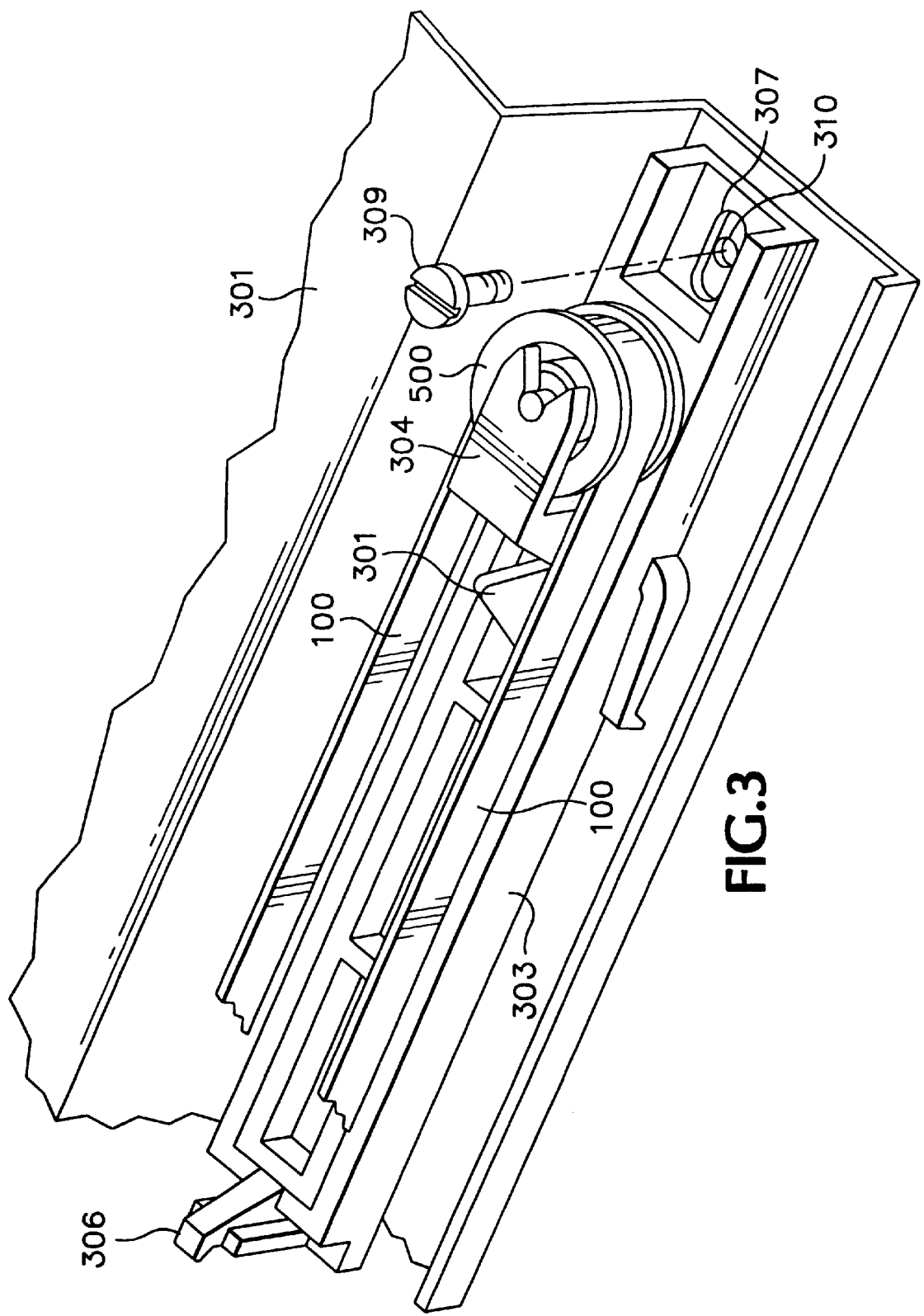
FIG. 3 is a perspective view schematic drawing of a belt tensioner subsystem in accordance with the present invention.
Figure 3A:
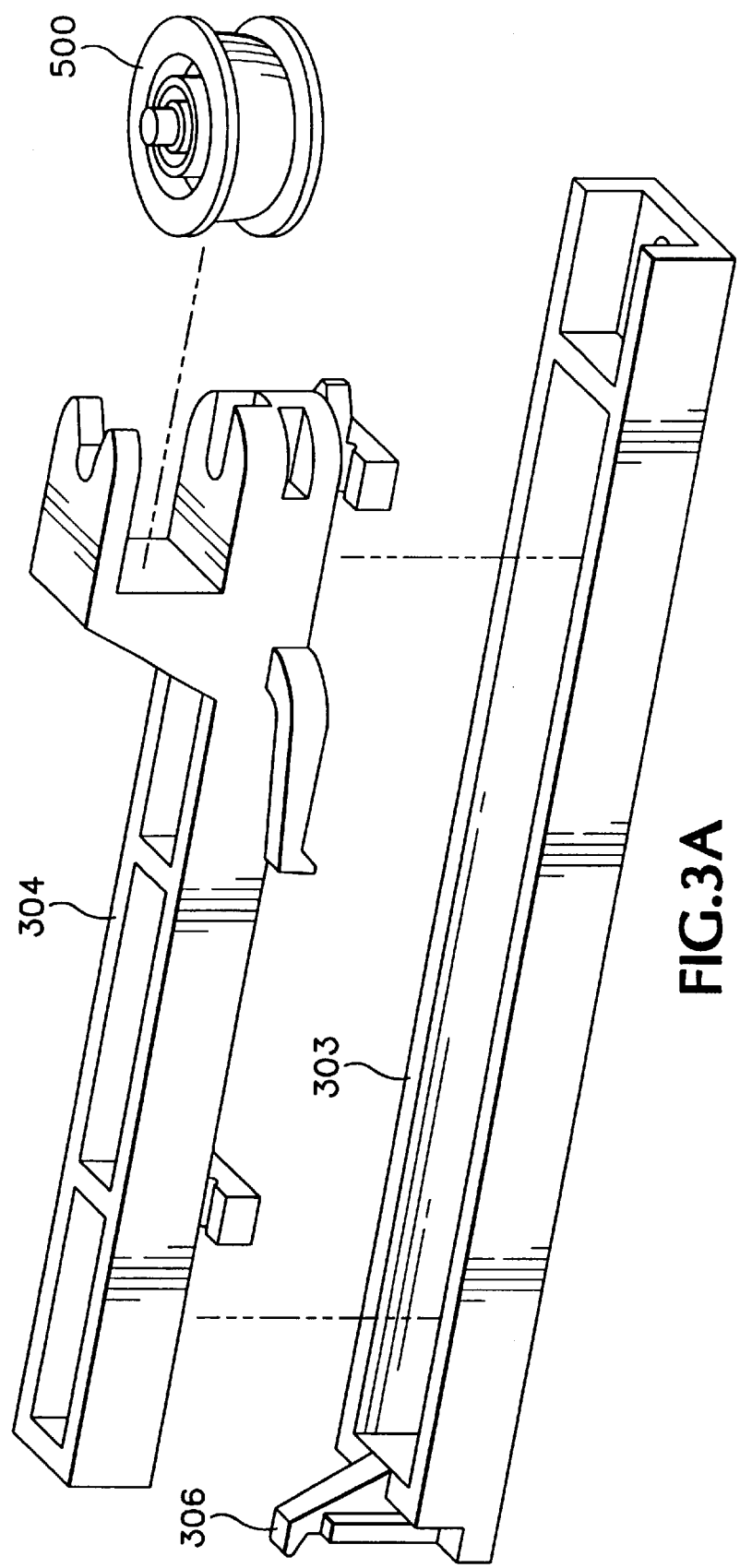
FIG. 3A is an exploded perspective view schematic drawing of a belt tensioner subsystem as shown in FIG. 3.

FIG. 3 is a thermally compensating, fixed center, belt tensioner subsystem in accordance with the present invention. FIG. 3A shows elements of the subsystem to in an exploded view. In FIG. 3, the subsystem is shown attached to a chassis 301. It will be recognized by those skilled in the art that this pen carriage drive subsystem may also be affixed to a platen, vacuum box, or other printer framework or subchassis as appropriate to a specific implementation. A separate tensioner frame 303 is provided. The frame 303 bears a centrally mounted pulley fork 304 for holding a belt pulley 500 in a general alignment position. A spring 311 (FIG. 4) is attached between the chassis 301 and a spring clip 306 provided on the tensioner frame 303, providing an initial belt 100 tension bias. Note that the belt pulley 500 is mounted for rotation to the pulley fork 304 and supported by the tensioner frame 303 and affixed with a fastener, such as a screw or bolt, 309 through adjustment aperture 307 to the chassis threaded hole 310. This approach is different from fixing the fork 304 directly to the chassis 301 as in a conventional fixed center tensioner manner. The fastener hole 307 and fastener 309 are provided in any known or proprietary manner for securing the tensioner frame 303 to the chassis 301, establishing a modified fixed center tensioner construct. The belt 100 load is now supported by two parts, the tensioner frame 303 and the pulley fork 304.

Usually a printer chassis 301 is fabricated of metal or plastic for stability, having a relatively high CTE It has been common to use a flexible but stiff belt 100, such as is known to be made of Kevlar™ material. Kevlar type materials have a relatively low CTE, negative in value.

Figure 4:
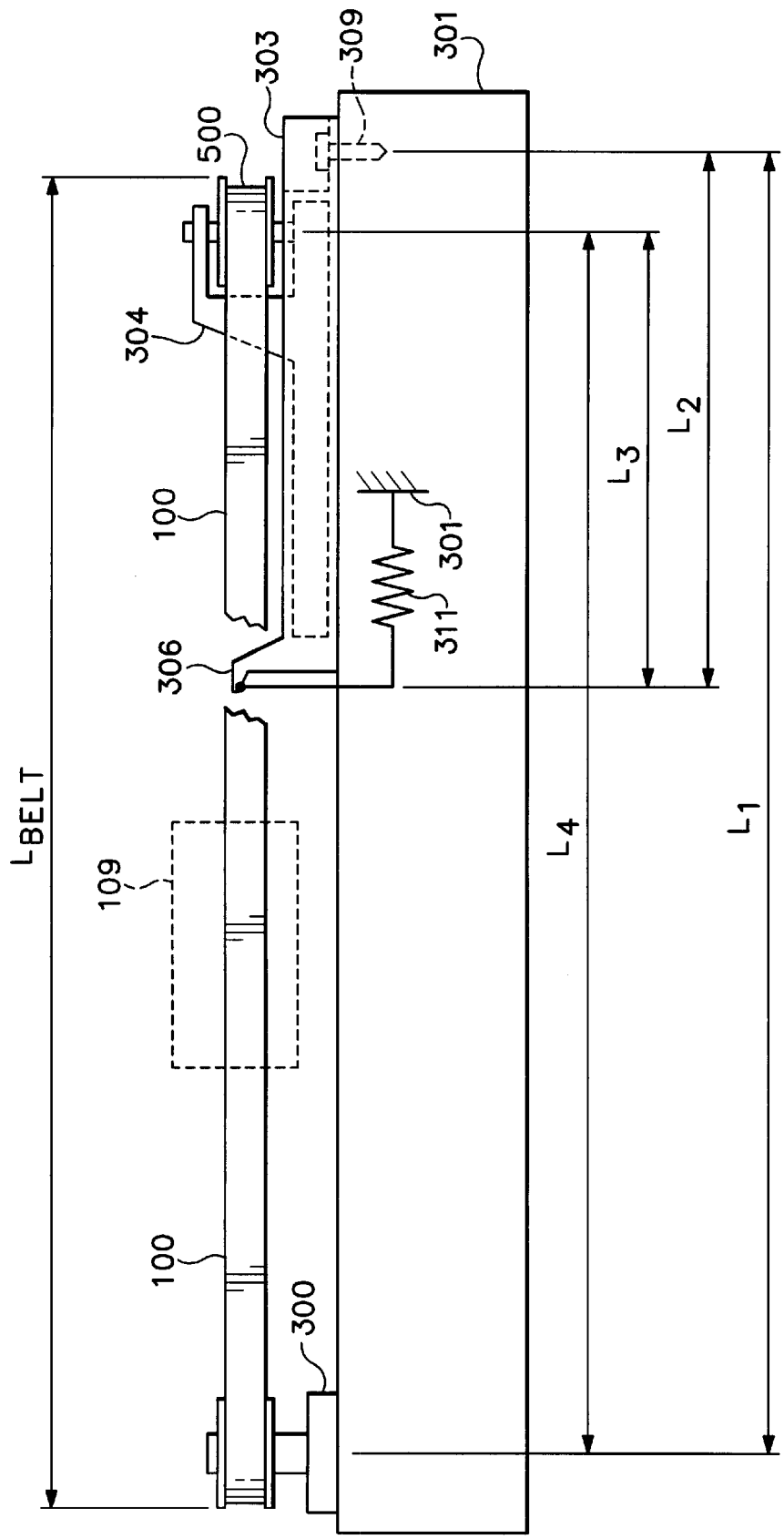
FIG. 4 is a schematic illustration of the belt tensioner subsystem as shown in FIGS. 3 and 3A to demonstrate operation thereof.

In accordance with the present invention, the tensioner frame 303 is fabricated of a material having a relatively high CTE, the pulley fork 304 is fabricated of a material having a relatively low CTE, the chassis has a relatively high CTE, and the belt having a low and negative CTE. The total net extension between the motor pulley shaft center 300 and the turn pulley center 500 is thus represented by the equation:

$$E_T = \Sigma E_i \Rightarrow i=1,2,3,4 \quad \text{(Equation 1)},$$

where $E_i = CTE_i * L_i * \Delta T$, where i=1,2,3,4, and $L_i$ are shown in FIG. 4, and where delta-T is the change in temperature in consistent units. Given a Kevlar fiber belt 100 material and a sheet metal chassis 301 material, it has been found that unfilled or low-content glass-filled polymers (such as of polycarbonate or Noryl™), thus having a relatively high CTE, are suitable for use as the tensioner frame 303 in the present invention.

Conversely, the pulley fork 304 is fabricated from a relatively low CTE material compared to the chassis 301 and frame 303 materials. It has been found that high glass-filled polymers are suitable for the pulley fork 304 material in accordance with the present invention. The design can be optimized for a specific implementation around the nominal dimensions of the parts and properties of the materials to ensure $E_T$ is theoretically zero during temperature excursions.

The dynamics of the construct is illustrated schematically in FIG. 4. As a manufacturing, post-assembly process, the design specified belt tension is set by affixing the frame 303 to the chassis with a screw 309, or another attachment method, against the bias of the chassis spring 311. As ambient temperature rises:

1) the chassis 301 expands proportional to $CTE_1$, $L_1$ increases in length,
2) the frame 303 expands proportional to $CTE_2$, $L_2$ increases in length,
3) the turn fork 304 expands proportional to $CTE_3$, $L_3$ increases in length, and
4) the belt 100 expands proportional to $CTE_4$, $L_4$ increases in length, for positive CTE and decreases in length for negative CTE.

Hence, the net extension of the motor pulley rotational axis 300 to the idler pulley rotational axis 500 is described by the equation:

$$E_{NET} = [(CTE_1 * L_1) - (CTE_2 * L_2) + (CTE_3 * L_3) + (CTE_4 * L_4)] \Delta T \quad \text{(Equation 2)}.$$

Because of the constructs use of different CTE material and the different length elements, as the chassis 301 and frame 303 expand, increasing $L_1$ and $L_2$, the substantially unaffected pulley fork 304 moves the pulley 500 inwardly, maintaining $L_{BELT}$ within a predetermined design tolerance such that the design target belt tension as initially set against the spring bias remains substantially constant.

Thus, the present invention provides a thermally compensating belt drive tensioner useful in the construction of an ink-jet printer having at least one belt-driven writing instrument which scans the hard copy apparatus printing zone. Exemplary embodiment characteristics illustrating the concept of the present invention is represented in Table 1 below with geometry and properties for a hypothetical design.

TABLE 1

| Description | Variable | CTE | L1 | Material |
|---|---|---|---|---|
| 1 Chassis | L1 | 6.30E-06 /F | 400 mm | Steel |
| 2 Frame | L2 | 3.70E-05 /F | 95 mm | Polycarbonate - unfilled |
| 3 Fork | L3 | 1.30E-05 /F | 88 mm | Polycarbonate - 40% glass filled |
| 4 Belt | L4 | -1.00E-06 /C | 390 mm | Kevlar fiber |

In general, this can be expressed for designing a specific implementation as using materials having a CTE ratio of approximately 1/3 for fork material to frame material and a CTE ratio of approximately 2/1 for fork materials to chassis material. Given Equation 2:

$$E_{NET} = [(CTE_1 * L_1) - (CTF_2 * L_2) + (CTE_3 * L_3) + (CTE_4 * L_4)] \Delta T,$$

and solving for the fork dimension $L_3$:

$$L_3 = \frac{E_{NET} - CTE_1 L_1 \Delta T + CTE_2 L_2 \Delta T - CTE_4 L_4 \Delta T}{CTE_3 \Delta T},$$

to obtain a solution with no net extension, $E_{NET}{\sim}0$, and given temperature excursions of 35° C. and 95° F.:

$$L_3 = \frac{0 - 0.239 + 0.334 - (-0.014)}{0.001235}$$

$$L_3 = 0.$$

Hence, if the design ensures the "effective net belt extension" is eliminated during thermal excursion, the belt tension change will be unchanged.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result, The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . ."

What is claimed is:

1. A belt tensioner device comprising:
   a frame having an adjustable mount to a chassis;
   a pulley fork, biasingly mounted within the frame for selectively setting a predetermined belt tension; and
   a belt pulley mounted to the fork, wherein the frame and fork are co-associated and are fabricated of materials each having a complementary coefficient of thermal expansion (CTE) for counterbalancing respective displacements due to temperature excursions affecting the belt tension,
   wherein the device is for coupling a belt to a motor pulley shaft fixedly mounted on the chassis, wherein the chassis is fabricated of a material having a $CTE_{chassis}$, the frame is fabricated of a frame material having a $CTE_{frame}$ which is greater than $CTE_{chassis}$ and the pulley fork is fabricated of a material having a $CTE_{fork}$ which is substantially less than the $CTE_{chassis}$ for a belt fabricated of a material having a $CTE_{belt}$ which is negative and substantially less in magnitude than the $CTE_{chassis}$.

2. The device as set forth in claim 1 wherein chassis and frame respective expansion and contraction (EC) are complementary such that during the temperature excursions the pulley fork moves the belt pulley inwardly or outwardly relative to the chassis, maintaining a predetermined tolerance such that a predetermined belt tension as initially set with the pulley fork bias remains substantially constant.

3. The device as set forth in claim 2 comprising:
   total net extension of the belt between a rotational axis of the motor pulley shaft and a rotational axis of the belt pulley is in accordance with the equation:

$E_r = \Sigma \Rightarrow i=1,2,3,4$ where $E_i = CTE_i * L_i * \Delta T_1$ and $L_1$ is a distance between the rotational axis of the motor pulley shaft and a distal point constituting a mounting point where the frame is affixed to said chassis, $L_2$ is a length of the frame from an end proximate the motor pulley shaft to a distal end adjacent the mounting point, $L_3$ is a length of the fork from the end proximate the motor pulley shaft to the rotational axis of the belt pulley shaft, $L_4$ is a belt nominal center-center distance between respective axes of rotation, and $\Delta T$ is the temperature change.

4. The device as set forth in claim 3, comprising:
   net extension of the motor pulley rotational axis to the rotational axis of the belt pulley shaft is governed in accordance with the equation:

$E_{NET} = ((CTE_1 * L_1) - (CTE_2 * L_2) + (CTE_3 * L_3) + (CTE_4 * L_4)) \Delta T.$ 5. The device as set forth in claim 1, comprising:
   the device fabricated of materials having a CTE ratio of approximately 1/3 for fork material to frame material and a CTE ratio of approximately 2/1 for fork materials to chassis material.

6. A belt tensioner for an apparatus having a chassis with a belt drive motor affixed thereon for providing translational motion to a belt coupled thereto, wherein the chassis formed of a material having a first coefficient of thermal expansion (CTE), comprising:
   first means for holding a belt pulley axle, the first means including means for fixedly attaching the belt tensioner to the chassis such that the belt is in tension between the belt drive motor and the belt pulley and such that material expansion and contraction (EC) of the first means due to thermal expansion and contraction is diametrically opposed to material EC of the chassis, wherein the first means formed of a material having a second CTE and wherein the first CTE and the second CTE are related in proportion to a ratio of a linear distance between the motor and the means for fixedly attaching the belt tensioner and the distance between the pulley axle and the means for fixedly attaching the belt tensioner such that EC of each is in substantially identical proportion to the ratio; and
   mounted in a movable relationship to the first means, second means for holding the belt pulley axle, wherein the second means is captured by the first means and the second means is formed of a material having a third CTE wherein the third CTE is substantially lower than the first CTE and the second CTE such that the second means is substantially unaffected during material EC of the chassis and the second means.

7. An ink-jet printhead scanning carriage drive belt tensioner subsystem for a drive motor and carriage drive belt system, wherein the drive motor is mounted in a first position on a chassis, comprising:
   a belt pulley having an axis of rotation;
   frame means for positioning the belt pulley with respect to the motor, including fastening means for affixing the frame means to the chassis at a second position; and fork means for positioning the belt pulley on the frame means such that the belt pulley is between the first position and the second position and the belt is tensioned between the motor and the pulley;

the chassis, the frame means, and the fork means each being fabricated of a material having a differing, compensating, coefficient of thermal expansion (CTE) characteristic such that material expansion and contraction (EC) of the chassis and the frame means is balanced wherein the axis of rotation remains in a substantially constant position with respect to the first position.

8. A method for maintaining a predetermined tension of a drive belt between a belt drive motor and a belt pulley, comprising the steps of:

affixing the motor to a chassis at a first predetermined position using a mount having a known mount material coefficient of thermal expansion (CTE);

affixing the pulley on a frame at a predetermined frame position, the frame having a known frame material CTE;

affixing the frame to the chassis at a second predetermined position such that the predetermined tension is established and the pulley is located along a plan between the first predetermined position and the second predetermined position, wherein the length $L_2$ of the frame and the length $L_3$ of the fork is related to the frame material CTE and the fork material CTE, the chassis material CTE and length $L_1$, and the belt CTE and length $L_{Belt}$, wherein means for affixing the pulley on the frame comprises a material having an affixing means CTE substantially less than the frame material CTE such that substantially no material expansion and contraction (EC) is experienced by the means for affixing during proportional material EC of the mount and the frame.

9. The method as set forth in claim 8, comprising the step of:

using materials having a CTE ratio of approximately 1/3 for fork material to frame material and a CTE ratio of approximately 2/1 for fork materials to chassis material.

10. An ink-jet hard copy apparatus, having a scanning carriage riding on a belt for translating at least one ink-jet writing instrument mounted on the carriage across adjacently positioned print media, comprising:

an apparatus chassis, fabricated of a material having a coefficient of thermal expansion ($CTE_{chassis}$);

a drive motor mounted to the chassis at a first position and driving a motor pulley;

at a second position, a belt pulley mounted on a pulley frame by a pulley fork such that said belt is tensioned between said motor pulley and said belt pulley, wherein the pulley frame is fabricated of a frame material having a $CTE_{frame}$ which is greater than $CTE_{chassis}$ and wherein the pulley fork is fabricated as a fork material having a third $CTE_{fork}$ which is substantially less than the $CTE_{chassis}$ and the belt pulley axis during thermal excursions wherein the belt material CTE is non-affective as relative to the $CTE_{fork}$, $CTE_{chassis}$, $CTE_{frame}$; and wherein the pulley frame is affixed to the chassis proximate the second position such that a predetermined belt tension is established and maintained regardless of material expansion and contraction (EC) of the chassis and the frame such that there is substantially no center-center change between the motor pulley axis-of-rotation and the belt pulley axis-of-rotation.

11. The apparatus as set forth in claim 10, comprising chassis and frame EC are complementary such that during the temperature excursions the pulley fork moves the pulley inwardly or outwardly, maintaining a predetermined tolerance such that a predetermined belt tension as initially set with the pulley fork bias remains substantially constant.

12. The apparatus as set forth in claim 11, comprising:

wherein the EC of the belt is negligible, total net extension of the belt between the motor pulley shaft center and a shaft center of the belt pulley is in accordance with the equation:

$$E_t = \Sigma E_i$$

where $E_i = CTE_i * L_i * \Delta T$, i=1,2,3, $L_1$ is a distance between the respective shaft centers, $L_2$ is a length of the frame, $L_3$ is a length of the fork from an end proximate the motor pulley shaft center to the belt pulley shaft center, and delta-T is change in temperature in consistent units.

13. The apparatus as set forth in claim 11, comprising:

the frame is fabricated of a frame material having a $CTE_{frame}$ which is greater than $CTE_{chassis}$, the pulley fork is fabricated of a material having a $CTE_{fork}$ which is substantially less than the $CTE_{chassis}$, and the belt is fabricated of a material having a $CTE_{belt}$ which is negative and substantially less in magnitude than the $CTE_{chassis}$ such that there is substantially no effective net belt extension during thermal excursions and wherein the belt tension change is substantially eliminated.

14. The apparatus as set forth in claim 10, comprising:

wherein there is no substantive thermal expansion or contraction of the belt, net extension of the motor pulley rotational axis to the idler pulley rotational axis is governed in accordance with the equation:

$$E_{NET} = ((CTE_1 * L_1) - (CTE_2 * L_2) + (CTE_3 * L_3)) \Delta T.$$

15. The apparatus as set forth in claim 10, comprising:

the fork, frame, and chassis being of materials having a CTE ratio of approximately 1/3 for fork material to frame material and a CTE ratio of approximately 2/1 for fork materials to chassis material.

16. A belt tensioner device, comprising:

adjustably mountable frame for mounting to a chassis;

pulley fork biasingly mounted within the frame; and belt pulley mounted to the fork wherein the frame and fork are co-associated and fabricated of materials each having a complementary coefficient of thermal expansion (CTE) for counterbalancing respective displacements due to temperature excursions affecting belt tension, the device fabricated of materials having a CTE ratio of approximately 1/3 for fork material to frame material and a CTE ratio of approximately 2/1 for fork materials to chassis material.

* * * * *